United States Patent [19]
Jiang

[11] Patent Number: 5,847,949
[45] Date of Patent: Dec. 8, 1998

[54] BOOST CONVERTER HAVING MULTIPLE OUTPUTS AND METHOD OF OPERATION THEREOF

[75] Inventor: Yimin Jiang, Plano, Tex.

[73] Assignee: Lucent Technologies Inc., Murray Hill, N.J.

[21] Appl. No.: 946,429

[22] Filed: Oct. 7, 1997

[51] Int. Cl.$^6$ .................................................. H02M 7/08
[52] U.S. Cl. ........................... 363/65; 363/39; 323/225; 307/82
[58] Field of Search .................................. 363/39, 44, 45, 363/46, 65, 89, 90; 323/222, 223, 225, 232, 224; 307/89, 91, 11, 38, 39, 82, 110, 151

[56] References Cited

U.S. PATENT DOCUMENTS 5,172,536  12/1992  Haas et al. ............................. 363/37 X
5,726,872   3/1998  Vinciarelli et al. ................. 323/222 X
5,736,841   4/1998  Gucyski ................................... 323/222

Primary Examiner—Peter S. Wong
Assistant Examiner—Y. J. Han

[57] ABSTRACT

A boost converter for converting an input voltage received at an input thereof into first and second output voltages provided at first and second outputs thereof, respectively, a method of power conversion and a power converter employing the boost converter or the method. In one embodiment, the boost converter includes: (1) a first switching circuit coupled to a first rail of the input and having a first switch and a first capacitor coupled in parallel, (2) a second switching circuit coupled to a second rail of the input and having a second switch and a second capacitor coupled in parallel and (3) a boost inductor, coupled in series between the first switching circuit and the second switching circuit, that provides a conductive path for the input DC voltage to flow serially through the first switching circuit and the second switching circuit to charge the first and second capacitors, respectively.

20 Claims, 2 Drawing Sheets

BOOST CONVERTER HAVING MULTIPLE OUTPUTS AND METHOD OF OPERATION THEREOF

TECHNICAL FIELD OF THE INVENTION

The present invention is directed, in general, to power converters and, more specifically, to a boost converter having multiple, electromagnetic interference (EMI)-quiet outputs and a method of power conversion that yields multiple, EMI-quiet output voltages.

BACKGROUND OF THE INVENTION

A power converter is a power processing circuit that converts an input voltage or current source into a specified output voltage or current. In off-line applications wherein power factor correction, total harmonic distortion (THD) reduction and a stable, regulated voltage are desired, the power converter typically employs a boost converter.

The power converter generally includes an input electromagnetic interference (EMI) filter, coupled to a source of alternating current (AC) power. A rectifier, coupling the EMI filter to the boost converter, rectifies the AC power to produce an unregulated DC voltage. The boost converter receives the unregulated DC voltage and generates therefrom a controlled, high DC voltage. A DC/DC converter, coupled to the boost converter, then converts the high DC voltage (e.g., 400 VDC) to a lower voltage (e.g., 48 VDC or 24 VDC).

A conventional boost converter generally includes an inductor, coupled between a source of input voltage (e.g., the rectifier that provides the unregulated DC voltage) and a power switch. The power switch is then coupled in parallel with a rectifying diode and an output capacitor. The output capacitor is usually large to ensure a constant output voltage to a load (e.g., a DC/DC converter). The output voltage (measured at the load) of the boost converter is always greater than the input voltage.

The boost converter operates as follows. When the power switch is conducting, the rectifying diode is reverse-biased, isolating the output capacitor and, therefore, the load. During this period, the input voltage supplies energy to charge the inductor and inductor current rises. Since the load is isolated from the input voltage, a stored charge in the output capacitor powers the load. When the power switch is not conducting, the inductor current decreases as energy from both the inductor and the input flows forward through the rectifying diode, charging the output capacitor and powering the load. By varying a duty cycle of the power switch, the output voltage of the boost converter may be controlled.

For high AC input voltages, in conjunction with the output voltage of a boost converter being greater than the input DC voltage, the output of the conventional boost converter may be too high for commonly available semiconductor devices. A so-called "three-level" boost converter that provides two equal output voltages has been suggested to accommodate semiconductor devices rated for approximately half the normal output voltage. The three-level boost converter generally consists of an inductor and two switching circuits (each having a power switch, rectifying diode and output capacitor) coupled in series. By dividing the output voltage between two outputs, the three-level boost converter reduces maximum voltage stresses across the semiconductor devices. Separate DC/DC converters may then be used with each output. If two DC/DC converters are used, only half of the output voltage is applied to each DC/DC converter. Switching devices in the DC/DC converters, therefore, can also be rated at half of the output voltage. Alternatively, a single DC/DC converter may be used, as with a conventional boost converter.

Switched-mode power converters generally suffer from EMI noise problems. Power converters, therefore, must be designed to meet domestic and international EMI regulatory requirements. A high switching frequency (e.g., 100 kHz) of the power switches is a major source of EMI. The input EMI filter shields the source of AC power from the EMI generated by the power switches.

Three-level boost converters may also contain EMI noisy outputs. One way to filter the switching frequency and thereby obtain EMI quiet outputs is to add an output EMI filter, consisting of an inductor and a capacitor. The output EMI filter normally has high Q characteristics due to practical design considerations. High Q filters, however, are difficult to damp without incurring substantial losses. It would therefore be preferable to eliminate the need for such filters.

Accordingly, what is needed in the art is a boost converter topology that provides EMI quiet outputs without requiring an additional filter, thereby reducing the losses associated with the filter.

SUMMARY OF THE INVENTION

To address the above-discussed deficiencies of the prior art, the present invention provides a boost converter for converting an input voltage received at an input thereof into first and second output voltages provided at first and second outputs thereof, respectively, a method of power conversion and a power converter employing the boost converter or the method. In one embodiment, the boost converter includes: (1) a first switching circuit coupled to a first rail of the input and having a first switch and a first capacitor coupled in parallel, (2) a second switching circuit coupled to a second rail of the input and having a second switch and a second capacitor coupled in parallel and (3) a boost inductor, coupled in series between the first switching circuit and the second switching circuit, that provides a conductive path for the input DC voltage to flow serially through the first switching circuit and the second switching circuit to charge the first and second capacitors, respectively.

The present invention therefore introduces the broad concept of relocating the boost inductor to a location serially between the first and second switching circuits to obtain two EMI-quiet converter outputs without requiring a filter.

In one embodiment of the present invention, the first switching circuit further has a first output rectifying diode, coupled in parallel with the first switch and in series with the first capacitor, that causes the first output voltage to be a DC voltage. In an embodiment to be illustrated and described, the rectifying diode has a terminal coupled directly to the boost inductor. This represents a relocation of the output rectifying diode compared to the prior art.

In one embodiment of the present invention, a rectifier supplies the input voltage, the input voltage being a DC input voltage. In a related embodiment, the rectifier is a three-phase rectifier. In a related embodiment, the rectifier is coupled, via an electromagnetic interference (EMI) filter, to a source of AC power. In a related embodiment, the rectifier receives AC power having a voltage ranging from 85 to 265 VAC. Those skilled in the art will appreciate that the above-described elements are enhancements to the present invention and are not required thereby.

In one embodiment of the present invention, the first output voltage is supplied to a first DC/DC converter and the second output voltage is supplied to a second DC/DC converter. The outputs of the first and second DC/DC converters may be paralleled to provide a single DC output for an overall power converter.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
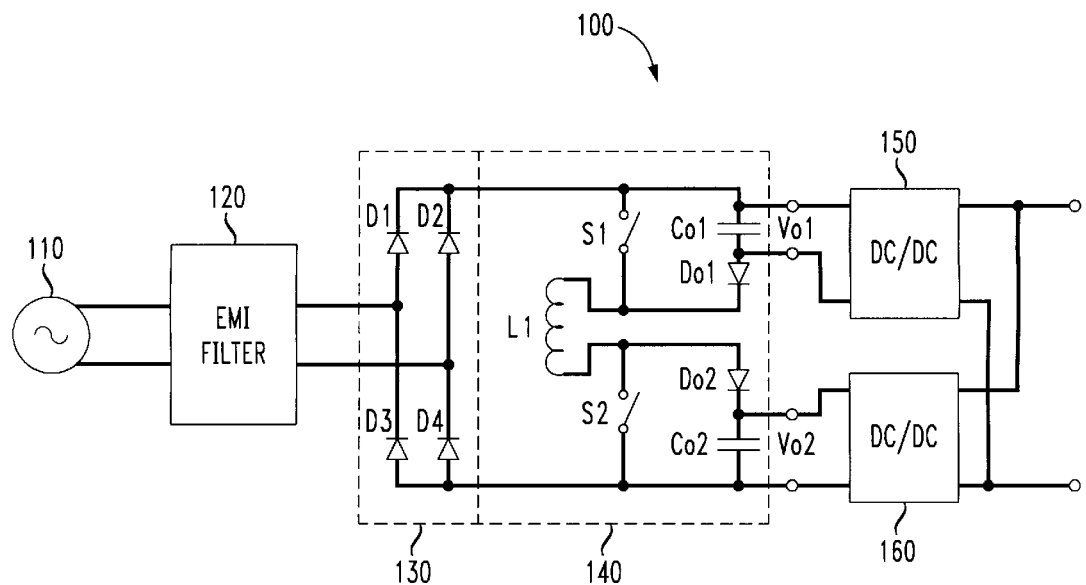
FIG. 1 illustrates a schematic diagram of an embodiment of a single phase power converter constructed according to the principles of the present invention.

Referring initially to FIG. 1, illustrated is a schematic diagram of an embodiment of a single phase power converter 100 constructed according to the principles of the present invention. The power converter 100 includes an EMI filter 120, coupled to a source of AC power 110. The power converter 100 further includes a rectifier 130 (consisting of diodes D1, D2, D3, D4), coupled to the EMI filter 120, that provides a rectified DC voltage. The power converter 100 further includes a boost converter 140, having an input and first and second outputs, coupled to the rectifier 130. The boost converter 140 receives the rectified DC voltage at the input, and generates therefrom first and second output voltages Vo1, Vo2 at the first and second outputs. The power converter 100 still further includes first and second DC/DC converters 150, 160, is coupled to the first and second outputs of the boost converter 140, respectively. The EMI filter 120, rectifier 130 and first and second DC/DC converters 150, 160 are well known in the art and, as a result, will not be described in detail.

In the illustrated embodiment, the boost converter 140 includes a first switching circuit coupled to a first rail of the input. The boost converter 140 further includes a second switching circuit coupled to a second rail of the input. The boost converter 140 still further includes a boost inductor L1, coupled in series between the first switching circuit and the second switching circuit. The inductor L1 provides a conductive path for the DC voltage to flow serially through the first switching circuit and the second switching circuit.

The first switching circuit includes a first switch S1, coupled in parallel to a first capacitor Co1. The first switching circuit further includes a first output rectifying diode Do1, coupled in parallel with the first switch S1 and in series with the first capacitor Co1. The first output rectifying diode Do1 rectifies the first output voltage Vo1 to a DC voltage. The first switching circuit then provides the first output voltage Vo1 across the first output capacitor Co1.

The second switching circuit includes a second switch S2 coupled in parallel to a second capacitor Co2. The second switching circuit further includes a second output rectifying diode Do2, coupled in parallel with the second switch S2 and in series with the second capacitor Co2. The second output rectifying diode Do2 rectifies the second output voltage Vo2 to a DC voltage. The second switching circuit then provides the second output voltage Vo2 across the second output capacitor Co2. In the present embodiment, the first output voltage Vo1 equals the second output voltage Vo2. If the first and second DC/DC converters 150, 160 are equivalent, the outputs of the first and second DC/DC converters 150, 160 may then be paralleled to provide a single DC output.

The power converter 100 operates as follows. The EMI filter 120 filters the AC power received from the source of AC power 110. In the illustrated embodiment, the power converter 100 has universal input capability and may, therefore, operate with voltages ranging from 85 to 265 VAC. The rectifier 130 then takes the filtered voltage and produces therefrom an unregulated, rectified DC voltage for input to the boost converter 140.

The power converter 100 may be operated in either a common drive or an interleaved mode of operation. In the common drive mode, the first and second switches S1, S2 operate from a common drive signal.

During a first period of operation, the first and second switches S1, S2 are closed. Input current flows through the first switch S1, the boost inductor L1 and the second switch S2. The first and second output rectifiers Do1, Do2 are reverse-biased, effectively isolating the first and second output capacitors Co1, Co2. An inductor current rises as the input current charges the boost inductor L1. During the first period of operation, the first and second DC/DC converters 150, 160 are powered by stored charges from the first and second output capacitors Co1, Co2, respectively.

During a complementary period of operation, the first and second switches S1, S2 are open. Current now flows through the first output capacitor Co1, the first output rectifier Do1, the boost inductor L1, the second output rectifier Do2 and the second output capacitor Co2. Energy from the input, along with energy stored in the boost inductor L1, charges the first and second capacitors Co1, Co2 and provides power to the first and second DC/DC converters 150, 160. The first and second output voltages Vo1, Vo2 may, of course, be controlled by varying a duty cycle of the first and second switches S1, S2. Various methods of controlling the duty cycle of the first and second switches S1, S2 (e.g., pulse-width modulation) are familiar to those skilled in the art and, as a result, will not be discussed. The first and second DC/DC converters 150, 160 then convert the first and second output voltages Vo1, Vo2 into first and second regulated DC voltages for powering a load.

Placing the boost inductor L1 in series between the switching circuits reduces the EMI noise from a high switching frequency of the first and second switches S1, S2 by allowing a direct coupling between an EMI quiet output of the rectifier 130 and the first and second output voltages Vo1, Vo2. The power converter 100 thus provides two quiet outputs, eliminating the need for an output EMI filter and its inherent disadvantages.

Alternatively, for input voltages Vin greater than the first or second output voltage Vo1, Vo2, but less than a sum of the first and second output voltages Vo1, Vo2, the power converter 100 may be operated in an interleaved mode. The interleaved mode of operation is well known in the art and, as a result, will not be described in detail. Since the input voltage Vin is greater than the first or second output voltage Vo1, Vo2, only one of the first and second switches S1, S2 need to conduct to charge the inductor L1. The converter 100 is, therefore, capable of achieving high efficiencies in the interleaved mode of operation.

Figure 2:
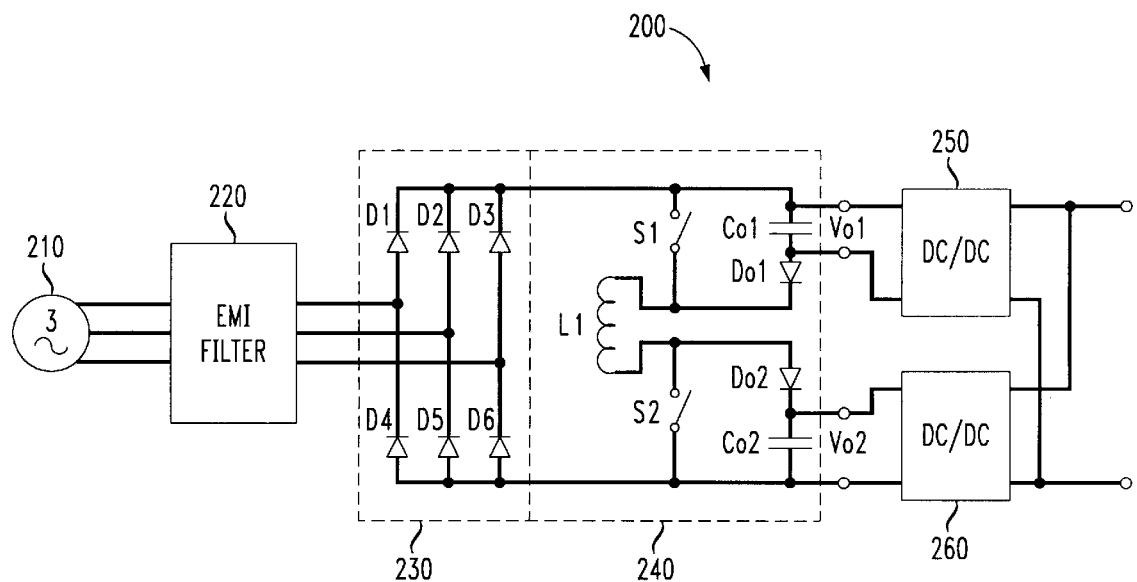
FIG. 2 illustrates a schematic diagram of an embodiment of a three-phase power converter constructed according to the principles of the present invention.

Turning now to FIG. 2, illustrated is a schematic diagram of an embodiment of a three-phase power converter 200 constructed according to the principles of the present invention. The power converter 200 includes a three-phase EMI filter 220 coupled to a source of three-phase AC power 210. The power converter 200 further includes a three-phase rectifier 230 consisting of diodes D1, D2, D3, D4, D5, D6. The three-phase rectifier 230 couples the EMI filter 220 to a boost converter 240. First and second DC/DC converters 250, 260 are coupled to outputs of the boost converter 240. Those skilled in the art are familiar with EMI filters, rectifiers and DC/DC converters.

The boost converter 240 is analogous to the boost converter 140 of FIG. 1 and therefore, will not be described. The boost converter 240 may thus be used in three-phase or in single-phase power converters. Those skilled in the art realize, of course, that boost converters are DC/DC topologies and therefore are also employable in systems having a DC voltage source.

For high input voltages, the boost converters 140, 240 of FIGS. 1 and 2, respectively, allow the use of lower voltage switching devices and a smaller boost inductor, thus providing better performance than a conventional boost converter. For lower input voltages, however, the conversion efficiency of the boost converters 140, 240 is comparable to that of the conventional boost converter, since input current must flow through more switching devices, resulting in conductive losses associated therewith.

Figure 3:
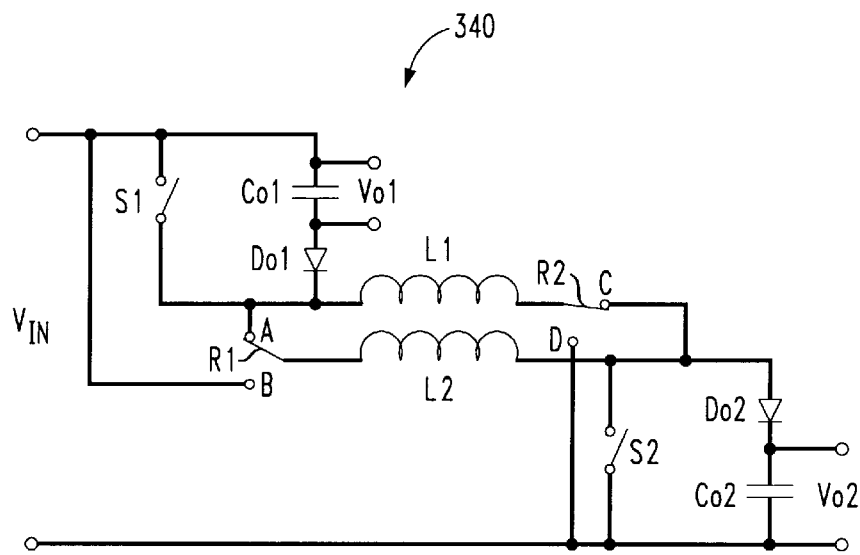
FIG. 3 illustrates a schematic diagram of an embodiment of a boost converter, configurable to operate with either high or low input voltages.

Turning now to FIG. 3, illustrated is a schematic diagram of an embodiment of a boost converter 340, configurable to operate with either high or low input voltages. The boost converter 340 includes a first switching circuit, coupled to a first boost inductor L1 and a first configuration switch R1. The first boost inductor L1 is coupled, via a second configuration switch R2, to a second switching circuit. The first configuration switch R1 is coupled, via a second boost inductor L2, to the second switching circuit. The first switching circuit includes a first switch S1 coupled in parallel to a first output capacitor Co1 and a first output rectifying diode Do1. The second switching circuit includes a second switch S2 coupled in parallel to a second output rectifying diode Do2 and a second output capacitor Co2. The first and second switching circuits produce a first and second output voltage Vo1, Vo2 across the first and second output capacitors Co1, Co2, respectively.

Under high input voltage conditions, when a peak of the input voltage of the AC power is more than the first or second output voltage Vo1, Vo2, the first and second configuration switches R1, R2 switch to couple the first and second boost inductors L1, L2 in parallel. The first and second boost inductors L1, L2 therefore provide a conductive path between the first and second switching circuits. DC voltages may thus flow serially through the first switching circuit, the first and second boost inductors L1, L2, and the second switching circuit. Since the first and second switching circuits are series-configured, lower voltage devices may be used, as in the conventional three-level boost converter. The location of the first and second boost inductors L1, L2, serially between the first and second switching circuits provides EMI quiet outputs, analogous to the boost converter 140 of FIG. 1.

Figure 4:
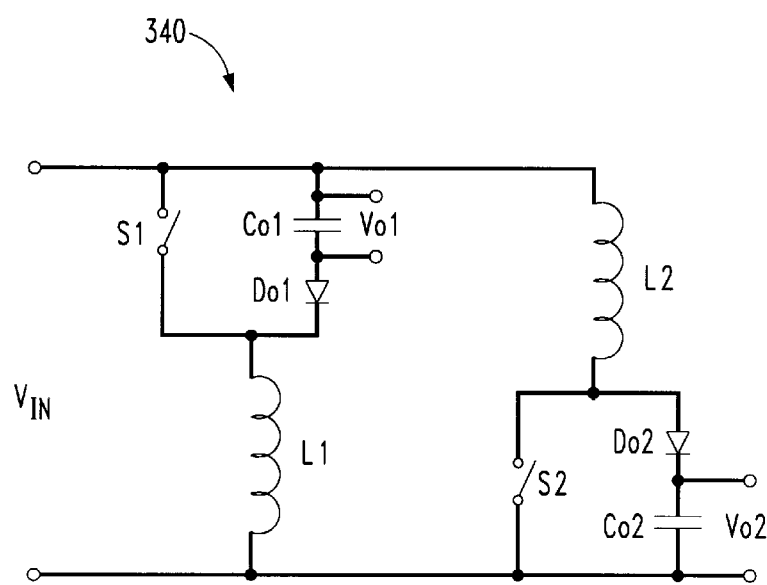
FIG. 4 illustrates a simplified schematic diagram of the boost converter of FIG. 3 under low input voltage conditions.

Referring also to FIG. 4, illustrated is a simplified schematic diagram of the boost converter 340 of FIG. 3 under low input voltage conditions. Low input voltages exist when a peak of the input voltage is less than the first or second output voltage Vo1, Vo2. Since each switch is rated for the first or second output voltage Vo1, Vo2, respectively, the first and second switches S1, S2 can individually withstand the respective output voltages. The configuration switches R1, R2, therefore, place the first and second switching circuits in a parallel configuration. Conduction losses may thus be reduced, since there are now two switches to carry current in parallel.

In the parallel configuration, the boost converter 340 may also be operated in an interleaved mode, resulting in reduced input current ripple. Interleaved and non-interleaved modes of operation are familiar to those skilled in the art and, as a result, will not be described.

The boost converter 340 of FIG. 3 thus combines the quiet outputs of, for instance, the boost converter 140 of FIG. 1 with configuration capabilities, resulting in higher efficiencies at low input voltage conditions.

Those skilled in the art should understand that the previously described embodiments of the boost converter (and applications employed therewith) are submitted for illustrative purposes only; other embodiments capable of providing quiet outputs without the use of an EMI filter are well within the broad scope of the present invention. For a better understanding of power electronics, including power rectifiers and boost converters, see *Power Electronics: Converters, Applications and Design*, by N. Mohan, T. M. Undeland and W. P. Robbins, John Wiley & Sons Publishing Company (1989) incorporated herein by reference.

Although the present invention has been described in detail, those skilled in the art should understand that they can make various changes, substitutions and alterations herein without departing from the spirit and scope of the invention in its broadest form.

What is claimed is:

1. A boost converter for converting an input voltage received at an input thereof into first and second output voltages provided at first and second outputs thereof, respectively, comprising:

a first switching circuit coupled to a first rail of said input and having a first switch and a first capacitor coupled in parallel;

a second switching circuit coupled to a second rail of said input and having a second switch and a second capacitor coupled in parallel; and a boost inductor, coupled in series between said first switching circuit and said second switching circuit, that provides a conductive path for said input DC voltage to flow serially through said first switching circuit and said second switching circuit to charge said first and second capacitors, respectively.

2. The boost converter as recited in claim 1 wherein said first switching circuit further has a first output rectifying diode, coupled in parallel with said first switch and in series with said first capacitor, that causes said first output voltage to be a DC voltage.

3. The boost converter as recited in claim 1 wherein a rectifier supplies said input voltage, said input voltage being a DC input voltage.

4. The boost converter as recited in claim 3 wherein said rectifier is a three-phase rectifier.

5. The boost converter as recited in claim 3 wherein said rectifier is coupled, via an electromagnetic interference (EMI) filter, to a source of AC power.

6. The boost converter as recited in claim 3 wherein said rectifier receives AC power having a voltage ranging from 85 to 265 VAC.

7. The boost converter as recited in claim 1 wherein said first output voltage is supplied to a first DC/DC converter and said second output voltage is supplied to a second DC/DC converter.

8. A method of converting an input voltage into first and second output voltages, comprising:
   (a) receiving said input voltage into a first switching circuit coupled to a first rail of said input and having a first switch and a first capacitor coupled in parallel;
   (b) next receiving said input voltage into a boost inductor; and
   (c) next receiving said input voltage into a second switching circuit coupled to a second rail of said input and having a second switch and a second capacitor coupled in parallel, said boost inductor coupled in series between said first switching circuit and said second switching circuit to provide a conductive path for said input DC voltage to flow serially through said first switching circuit and said second switching circuit to charge said first and second capacitors, respectively.

9. The method as recited in claim 8 wherein said step (a) comprises the step of causing said first output voltage to be a DC voltage with a first output rectifying diode coupled in parallel with said first switch and in series with said first capacitor.

10. The method as recited in claim 8 further comprising the step of supplying said input voltage with a rectifier, said input voltage being a DC input voltage.

11. The method as recited in claim 10 wherein said rectifier is a three-phase rectifier.

12. The method as recited in claim 10 further comprising the step of filtering AC power provided from a source of AC power to said rectifier with an electromagnetic interference (EMI) filter.

13. The method as recited in claim 10 wherein said step of supplying comprises the step of receiving AC power into said rectifier that has a voltage ranging from 85 to 265 VAC.

14. The method as recited in claim 8 further comprising the steps of:

supplying said first output voltage to a first DC/DC converter; and supplying said second output voltage to a second DC/DC converter.

15. A power converter, comprising:
   a rectifier, couplable to a source of AC power, that provides rectified DC voltage;
   a boost converter, coupled to said rectifier, that converts said rectified DC voltage received at an input thereof into first and second output voltages provided at first and second outputs thereof, respectively, including:
      a first switching circuit coupled to a first rail of said input and having a first switch and a first capacitor coupled in parallel,
      a second switching circuit coupled to a second rail of said input and having a second switch and a second capacitor coupled in parallel, and
      a boost inductor, coupled in series between said first switching circuit and said second switching circuit, that provides a conductive path for said input DC voltage to flow serially through said first switching circuit and said second switching circuit to charge said first and second capacitors, respectively;
   a first DC/DC converter, coupled across said first capacitor, that converts said first output voltage into a first regulated DC voltage; and
   a second DC/DC converter, coupled across said second capacitor, that converts said second output voltage into a second regulated DC voltage.

16. The power converter as recited in claim 15 wherein said first switching circuit further has a first output rectifying diode, coupled in parallel with said first switch and in series with said first capacitor, that causes said first output voltage to be a DC voltage.

17. The power converter as recited in claim 15 wherein said first output voltage equals said second output voltage.

18. The power converter as recited in claim 15 wherein said rectifier is a three-phase rectifier.

19. The power converter as recited in claim 15 wherein said rectifier is coupled, via an electromagnetic interference (EMI) filter, to a source of AC power.

20. The power converter as recited in claim 15 wherein said rectifier receives AC power having a voltage ranging from 85 to 265 VAC.

* * * * *